3,632,832
OXIDATION OF 5-CARBOXYPHTHALIDE TO
TRIMELLITIC ACID
LeRoy S. Forney, Metuchen, N.J., assignor to
Mobil Oil Corporation
No Drawing. Filed Mar. 3, 1969, Ser. No. 804,008
Int. Cl. C07c 63/32
U.S. Cl. 260—523 R                           1 Claim

ABSTRACT OF THE DISCLOSURE 5-carboxyphthalide is oxidized to trimellitic acid with 10–50 percent nitric acid at 120–250° C. at autogenous pressure. Trimellitic acid (and its anhydride) is a well known material that is useful, for example, to prepare polyesters for baked finishes such as wire coatings.

BACKGROUND OF THE INVENTION

Field of the invention

This invention is directed to the nitric acid oxidation of 5-carboxyphthalide to trimellitic acid.

Description of the prior art

Trimellitic acid has been prepared by air or oxygen oxidation of 1,2,4-trimethylbenzene (pseudocumene). Insofar as is now known, it has not been proposed to prepare trimellitic acid from 5-carboxyphthalide.

A method used to remove impurities from 5-carboxyphthalide is to boil it in concentrated (68%) nitric acid. It was found that the nitric acid had no effect on 5-carboxyphthalide and did not even nitrate it in the absence of other strong acids such as $H_2SO_4$. Thus, it was somewhat surprising that dilute nitric acid could be successfully used to oxidize-5-carboxyphthalide.

SUMMARY OF THE INVENTION

This invention provides a method for producing trimellitic acid that comprises heating 5-carboxyphthalide with 10–50 percent nitric acid, under autogenous pressure, at a temperature between about 120° C. and about 250° C.

DESCRIPTION OF SPECIFIC EMBODIMENTS 5-carboxyphthalide (also named as 4-carboxy-1:2-phthalide) can be prepared by any of the methods known in the art. One preparation is described by Perkin and Stone in J. Chem. Soc. 127, 2275 (1925) at pages 2289 to 2291. Briefly, 2,4-dimethylbenzoyl chloride is chlorinated to a mixture of 2,4-di(chloromethyl) and 2,4-di-(dichloromethyl)benzoyl chlorides. This mixture is boiled with chalk and acidified to form 4-aldehydo-1,2-phthalide, which by action of sodium hydroxide and acidification formed 2-hydroxymethylterephthalic acid. The latter is converted by heat to 4-carboxy-1,2-phthalide. Another preparation has been described in Ber. 36, 843 (1903).

The oxidizing agent used in the process of this invention is dilute nitric acid of 10–50 percent concentration. The oxidation is carried out at a temperature between about 120° C. and about 250° C., preferably at about 150° C. The time of reaction will be between about 30 minutes and about 180 minutes.

The oxidation reaction is carried out under autogenous pressure, which is at 150° C. about 150 p.s.i.g. Accordingly, pressure equipment (e.g., an autoclave) should be used. The process can be carried out batchwise or continuously using suitable reactors, such as that described in British Patent No. 698,157 (1953).

Example 1.—5-carboxyphthalide (1.10 gms.; 0.006 mole) was charged to a thick walled glass tube of 10 ml. capacity, along with water (3.0 ml.), 65% nitric acid (commercial concentrated nitric acid, 2.0 ml.), and sodium nitrite (0.01 gm.). The tube was sealed, and placed in an oil bath at 150±0.5° C. for 160 minutes. After cooling in Dry Ice and $N_2$ (liquid), the tube was opened, brought to room temperature and the contents washed out with 5 ml. of water. A precipitate (0.814 g.) was collected by filtration, followed by a water wash and overnight drying (95° C./20 mm.). Evaporation of the combined mother liquor and wash solution gave additional material (0.475 gm.). The samples were analyzed by melting point (238–242° C./dec. and 238–240° C./dec. respectively) and infrared, as well as gas chromatography and infrared of methyl esters (prepared with methanol —$BF_3$ reagent). The only impurity detected in either sample was a small amount of terephthalic acid, present as a contaminant in the starting material and unchanged by the oxidation (4.6% and 0.7% of the product samples, respectively). The material balance, based on aromatic compounds, was 98.5%.

Example 2.—5-carboxyphthalide (17.8 gm.; 0.1 mole) was charged to an autoclave of 1000 ml. capacity, along with water (150 ml.), 65% nitric acid (commercial concentrated nitric acid, 100 ml.), and sodium nitrite (0.5 gm.). The autoclave was sealed and heated to 150° C. for 180 minutes, with stirring. The pressure rose to 150 p.s.i.g. The autoclave was cooled and opened to receive a slurry which was worked up in a manner of Example 1. Chromatography of product esters again indicated a trace of terephthalic acid as the only impurity. The I.R., N.M.R., and M.P. gave good agreement with that of trimellitic acid. A 75% yield (15.7 gms.) was achieved.

It will be recognized that the method of this invention can be used to convert other substituted phthalides to the corresponding substituted o-phthalic acids (or anhydrides). Likewise, phthalide itself can thus be oxidized to o-phthalic acid (or anhydride).

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claim.

What is claimed is:

1. A method for producing trimellitic acid that comprises heating 5-carboxyphthalide with 10–50 percent nitric acid, under autogenous pressure, at a temperature between about 120° C. and about 250° C.

References Cited

UNITED STATES PATENTS 2,971,011   2/1961   Liao et al. _____ 260—523

OTHER REFERENCES

Fieser et al.: Organic Chemistry, 3rd ed., 1956, pp. 660–1.

LORRAINE A. WEINBERGER, Primary Examiner

R. S. WEISSBERG, Assistant Examiner